United States Patent Office 3,270,340
Patented August 30, 1966

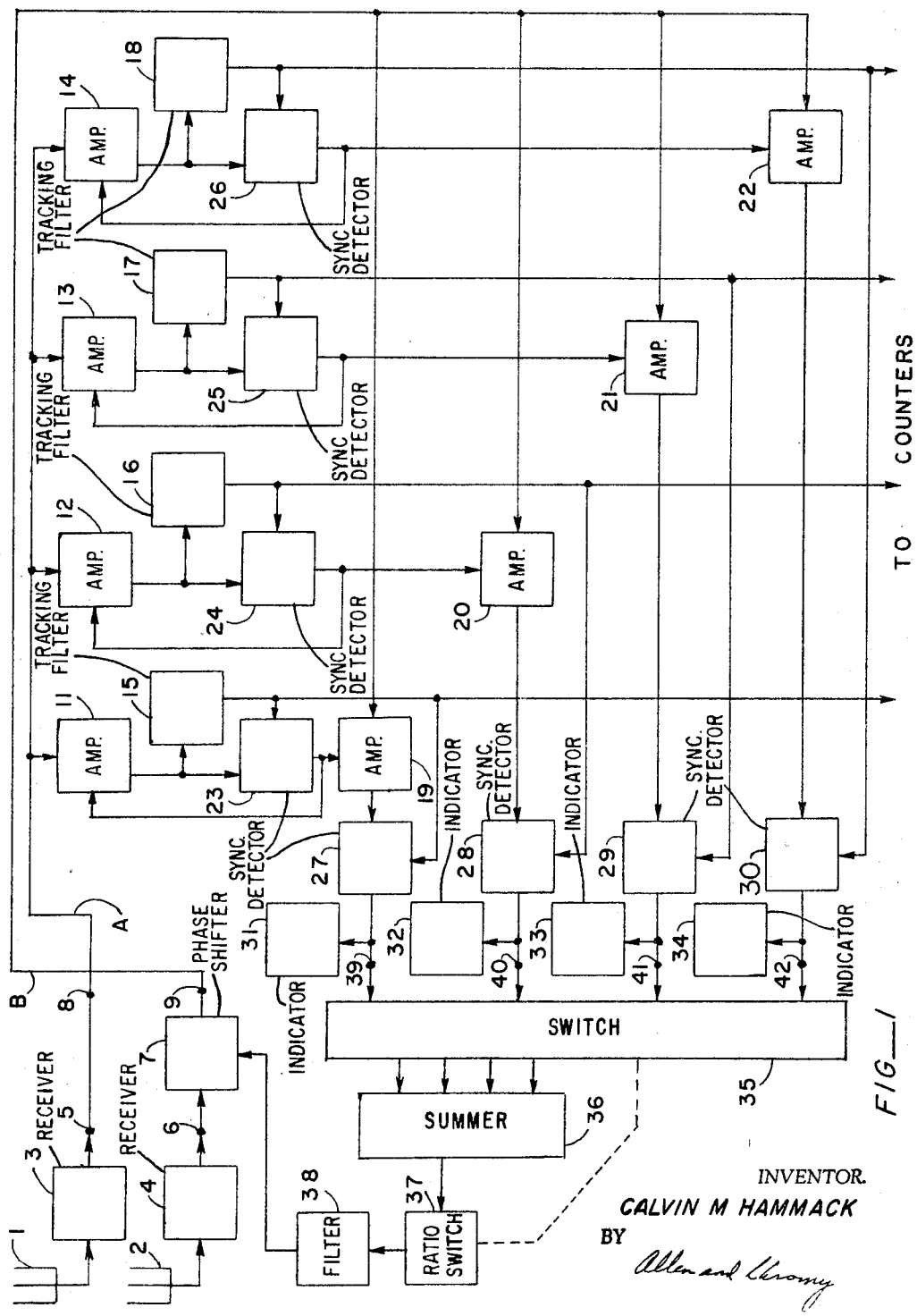
FIG_1

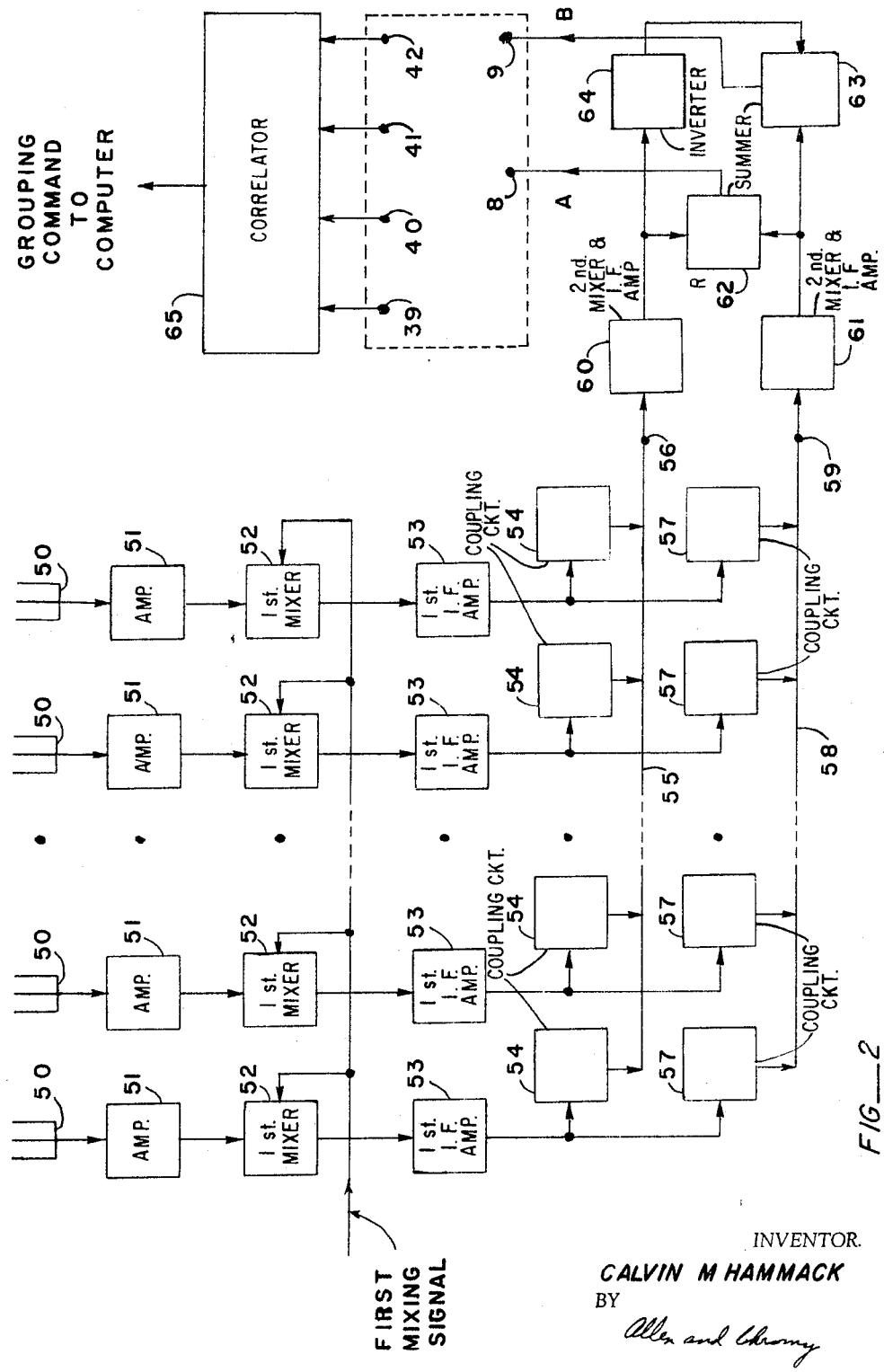

3,270,340
METHOD OF ECHO GROUPING
Calvin M. Hammack, P.O. Box 304, Saratoga, Calif.
Filed Sept. 30, 1963, Ser. No. 312,598
16 Claims. (Cl. 343—7)

My invention relates to the art of detecting reflecting objects by illuminating the objects by wave radiating means and receiving and detecting the echo waves received from the object. In particular, my invention is useful in polystation Doppler surveillance and tracking systems operating on moving targets, described in my patent applications Serial Numbers 86,770 filed February 2, 1961 and 278,191 filed May 6, 1963. However, my invention is also useful in other echo type systems wherein motion of the target is not required. Among systems of the type wherein my invention is useful are systems in which a plurality of transmitters, each located at a different site, are employed to illuminate a region of space, which may be called the surveillance space. Each of the transmitters illuminates this same space. A receiver, operating in cooperation with the transmitters, receives the reflected energy of all of the transmitters from each of the targets in the surveillance space. The signals of each of the transmitters are identified at the receiver either by distinctive modulation at the transmitter or by separate frequency assignment. Each of the echoes of each of the transmitters is detected and tracked at the receiver. In order to employ the detection and tracking information intelligently it is necessary to group the echoes of the several transmitters according to the target from which they are reflected. Systems comprising a plurality of receivers and a single transmitter or a plurality of both also contain this problem. An obvious method of echo grouping is by means of directive antennas or transducers at either the transmitting sites or the receiving sites, or both. However, for optimum design of the type of system for which my invention is useful, the antenna or transducer beams are not sufficiently narrow to preclude the occurrence of two or more reflecting targets within the beams. For this reason a system of multiple apertures is employed at the receiver similar to the monopulse method common in the radar art. It is assumed that no two targets remain at the same bearing with respect to the receiving station for a significant interval of time. Therefore, echoes from the several transmitters that all arrive at the receiving station from the same direction are assumed with great reliability to be from a single target provided the direction of arrival is sufficiently defined.

My invention described in this patent application provides a method of instrumental grouping of echo signals in a system comprising either a single receiving station and a plurality of transmitting stations, or a system comprising a single transmitting station and a plurality of receiving stations, all without the necessity of employing narrow aperture beams.

It is therefore an object of my invention to provide a method of associating into groups the echoes of waves emitted by a plurality of transmitters, reflected by a plurality of reflecting targets, and received at a receiving station, each group containing the signals of all the transmitters reflected from a single target and none other.

It is a further object of my invention to employ the geometrical circumstance of targets not long remaining in the same bearing from a given station to group the echoes according to the targets reflecting the echoes.

In detection and tracking systems comprising a single transmitting station and a plurality of receiving stations, it is an object of my invention to employ directional characteristics of radiative devices at the transmitter for the purpose of grouping the various echoes, each group containing the echo signals of a single reflecting target detected at the several receiving stations.

It is a further object of my invention to provide a method of echo grouping for systems comprising a plurality of both transmitting stations and receiving stations.

My invention can have a variety of forms, for example. Four species are immediately apparent and arise from the choice of phase monopulse or amplitude monopulse arrangement of the apertures, and the choice of servo-comparison or correlation of ratio magnitudes. Other variations of my invention will be apparent to one skilled in the art. Two preferred embodiments of my invention will be described in this application. The first preferred embodiment employs a phase monopulse type of arrangement of the apertures and a servo-method of grouping echoes of the same phase difference. The second preferred embodiment of my invention employs an amplitude monopulse arrangement of the apertures and an amplitude correlation method of grouping the targets with the same amplitude ratios. While both of the embodiments of my invention chosen for illustration in this application are associated with the electromagnetic art, my method is equally useful to underwater sound, acoustical, or other domains where wave or quanta may be transmitted, reflected and detected.

In the diagrams and description of the selected preferred embodiments of my invention, amplifiers, filters and other items are sometimes omitted where their inclusion is understood by one skilled in the art.

The two preferred embodiments of my invention indicated in the figures and text of this application are parts of Polystation Doppler systems in which there are four transmitting stations and one receiving station. Other systems have other numbers of transmitters, the number of transmitters depending upon the mode of computation employed.

Although monopulse methods are employed in some modifications of my invention, there is no need to determine the magnitudes of any angle or other geometrical quantity nor to determine the phase or magnitude of any electrical quantity. Thus there may be a wide variety of unbalance and instability in the system with no hindrance to the performance of its intended function. The object of the system is achieved through the comparison of detected signals to determine that they do or do not arrive at the receiving site from the same reflecting target.

The magnitudes of the angles between the waves arriving at the receiving station from different targets are of no essential interest and no attempt is made in the use of my system to measure them other than to ascertain that such angles exceed a discernable value. Thus there are modifications of my system in which essential objectives, parts and qualities of the monopulse type of system are totally absent.

Referring to the drawing briefly:

FIG. 1 is a block circuit diagram indicating the pertinent parts of a receiving apparatus employing phase comparison of the output signals from separate apertures for echo grouping;

FIG. 2 is a block circuit diagram indicating the pertinent parts of a receiving apparatus employing correlated amplitude ratios of the signals from separate apertures for echo grouping.

*System employing servo-phase comparison*

FIG. 1 shows the block circuit diagram of a receiving apparatus capable of selectively grouping the echoes of a given moving airborne target, which target is illuminated by four separate ground based transmitters employed in a Polystation Doppler system such as the type of the systems described in my prior patent applications. The four transmitters of the system transmit unmodulated continuous waves. The frequencies of the transmitters are separated by an amount somewhat in excess of the doppler bandwidth of the targets with which the system is to operate but sufficiently close together that the antennas, front ends, and I.F.'s of the receivers may be sufficiently broad in frequency bandwidth to include them all. Separation of the signals of each transmitter is accomplished in the latter stages of receiving apparatus where the signals are also separated according to their various doppler frequencies.

Antennas 1 and 2 are separate receiving apertures fixed in position and beam direction and looking in the same direction. They have identical characteristics. Their phase centers are separated by a finite distance, preferably at least a half wavelength and possibly several wavelengths. A signal coming from any point in space substantially removed from the vicinity of the antennas will produce equal amplitude signals at the outputs of the two antennas. Receivers 3 and 4 are matched systems sharing the same sources of injection signals for the first and second detectors. Receivers 3 and 4 include the R.F. stages, first detectors, first I.F. amplifiers, second detectors, and second I.F. amplifiers, and their respective outputs appear at terminals 5 and 6. The system contains only two such receiving equipments. The receivers 3 and 4 detect and amplify all of the signals from all of the transmitters and all of the targets. At the terminals 5 and 6 there are connected a plurality of identical equipments, one of which is shown in the remainder of the drawing. There is one of these equipments for every target that is to be tracked simultaneously. Isolation amplifiers and connecting circuitry are sometimes not shown as they are well understood in the art.

Terminal 5 is connected through point 8 to the inputs of four automatic gain controlled amplifiers 11, 12, 13 and 14. The outputs of the amplifiers 11, 12, 13 and 14 drive tracking filters 15, 16, 17 and 18, respectively. One tracking filter is provided for each transmitter in the system. Each tracking filter is designed to track selected signals in the doppler spectrum of just one of the transmitters. The filters for accomplishing this selection of the spectrum are a part of the tracking filters and are not shown separately. Alternatively, these transmitter selecting filters may be in amplifiers 11, 12, 13 and 14. Tracking filters adaptable to this use are made by Interstate Electronics Corporation of Anaheim, California. Tracking filters are also known as phase locked oscillators or phase locked loops. Each tracking filter is manually adjusted or set on a selected echo by an operator who may employ a spectrum analyser, not shown, to aid him. When adjusted to a single doppler echo one of these tracking filters continues to track the doppler frequency of that particular signal and none other. The signal at terminal 8 is called for reference the "A" signal. The signal at terminal 9 is called for reference the "B" signal.

The "B" signal output from phase shifter 7 is fed to the four automatic gain controlled amplifiers 19, 20, 21 and 22. Synchronous detectors 23, 24, 25 and 26 which are driven from the outputs of amplifiers 11, 12, 13 and 14, respectively, are synchronized by signals from the outputs of tracking filters 15, 16, 17 and 18, respectively. The outputs of the synchronous detectors 23, 24, 25 and 26 are the automatic gain control signals for the automatic gain controlled amplifiers 11, 12, 13 and 14, respectively, and the automatic gain controlled amplifiers 19, 20, 21 and 22, respectively. The lowpass filters customary at the output of the synchronous detectors are included here in the circuits of the detectors. The "B" signal outputs from the amplifiers 19, 20, 21 and 22 are fed to synchronous detectors 27, 28, 29 and 30, respectively. The output of each of the synchronous detectors 27, 28, 29 or 30 then consists of "B" signals associated with a single echo signal and none other. The usual lowpass output filter is not shown specifically and is regarded here as a part of the synchronous detector. The amplitudes of the signal outputs of the synchronous detectors 27, 28, 29 and 30 are connected to indicators 31, 32, 33 and 34, respectively. Each of these indicators indicates the ratio of the component of the "B" signal in phase with the "A" signal to the "A" signal itself for the particular target echo tracked by one of the tracking filters. The outputs of the synchronous detectors 27, 28, 29 and 30 are also fed through switch 35 to summer 36. The output of the summer is fed to ratio switch 37. The output of ratio switch 37 is fed to filter 38; and the output of filter 38 is fed as a control signal to the voltage controlled phase shifter 7. The function of the switch 35 and the ratio switch 37 is to permit the switching into the circuit of any of the outputs of the several channels in any sum combination, each of which channels corresponds to a different transmitter. The ratio switch 37 must be synchronized with the switch 35 so that the output of the switch 37 represents an average ratio rather than an ambiguous sum of ratios. When all channels are switched into the circuit the ratio switch provides an input to output signal ratio of 4 to 1.

When all four channels are switched in and all of the tracking filters are tracking the echoes of a single target, the ratios shown by indicators 31, 32, 33 and 34 are the same. These signals are averaged in the summer 36 and the ratio switch 37 and combine to control the phase of the signal from receiver 4 in such a manner as to tend to reduce the value of the "B" signal output from the summer 36 to the neighborhood of zero. Should one of the tracking filters be tracking a target different from the targets being tracked by the other tracking filters, and should that target be in such a position that the echoes from it arrive at the receiving station from a different direction, then the indication of the associated indicator would be substantially different from the indication of the other three indicators. This channel would be switched out of the circuit by the operator who would then seek the proper echo in the doppler spectrum, which proper echo would be associated with the same target as the other echo signals being tracked by the other tracking filters. In the operating procedure of target acquisition the channels are set on target one-by-one. The voltage controlled phase shifter 7 has a manual override control which is manipulated along with the manual override control of one of the tracking filters to lock the system on a single echo signal. When tracking is established the indicator of the channel being manipulated indicates an error signal in the neighborhood of zero. During the above process the other three trackers are switched out of the circuit. When the system is tracking a single target echo from a single target and a single transmitter, and the controls of the phase shifter 7 and the tracking filter employed are placed in the automatic position, a second tracker is adjusted manually until an echo is found whose indicated ratio is near zero. The zero indication on the manipulated channel indicates that the tracking filter of this channel is tracking an echo from the same target that is being tracked by the first adjusted channel. The switches 35 and 37 are then adjusted to include the output of this second channel in the control circuit of the voltage controlled phase shifter 7. The other channels are similarly set to track the signals from the same target originating from their respective transmitters.

The output of each of the tracking filters is fed to one of the counters of the system.

The tracking response of the system is largely determined by the filter 38 which provides the desired loop characteristics.

Under normal tracking conditions all of the indicators remain in the vicinity of zero indication. Should one of the tracking filters track an echo coming from a different direction, the indicator of that channel would show a large positive or negative voltage alerting the operator to the condition occurring. Threshold devices may be employed at these same points to automatically disengage any channel not tracking properly.

It is to be observed that there is no hybrid circuit combining in any fashion the "A" signal and the "B" signal nor any hybrid between the antennas as is common in the monopulse art. The first association of the "A" and "B" signal circuits occurs in the synchronous detectors 27, 28, 29 and 30. There is no requirement for phase balance between the "A" and "B" circuits. The gain characteristics of the A.G.C. amplifiers in the "A" and "B" circuits should be matched for best results. Systems employing hybrids may of course be synthesized to serve the object of echo grouping by observation of directional similarity.

*System employing correlated amplitude ratios*

FIGURE 2 is a block diagram of pertinent parts, including a phased array antenna, of a receiving system designed to perform echo grouping by correlation of amplitude ratios of two apertures pointing in different directions from a common phase center. The sensitivity beams of the apertures are overlapping so that the ratios of their outputs are dependent upon the bearing of the target from the receiver. The use of a single phased array antenna permits the location of the phase centers at a common point so that the phase difference between the outputs of the apertures is not dependent upon the bearing of the target from the receiving station. The tracking filters, A.G.C. amplifiers, synchronous detectors and indicators, shown in FIG. 1 between terminals 8 and 9 and terminals 39, 40, 41 and 42, are employed between the identically designated terminals in FIG. 2. In the system represented by FIG. 1, the grouping is accomplished by the application of the tracking filters to four appropriate echoes. In the system described by FIG. 2 the tracking filters are locked on the echoes of their particular transmitters without regard to grouping. Instead the grouping is accomplished by correlation means operating on the simultaneous data of a plurality of sets of channels. In conjunction with each transmitter there are as many of the tracking filters and associated circuitry as there are targets to be tracked. The function of the correlator is to group together those channels of the various transmitters whose direction sensitive circuitry indicates that they are tracking signals coming to the receiver from the same direction and therefore presumably from the same target.

The system represented by FIG. 2 employs a "sum and difference" circuit between the two aperture circuits whose outputs feed the multiplicity of tracking channels for all the transmitters and all the targets. There is only one "sum and difference" circuit required. The total number of tracking channels fed by the "sum and difference" circuit is the product of the number of transmitters employed multiplied by the number of targets to be tracked. Each of the multiple leads to the correlator indicated as 39, 40, 41 and 42 is composed of as many separate input leads as there are targets to be tracked. Each tracking channel has at its output the ratio of the "difference" signal ("B" signal) to the "sum" signal ("A" signal) which ratio is achieved in the method familiar in the monopulse art. This ratio is dependent upon the angular position of the target with respect to the receiving station. Reference is here made to the book "Introduction to Monopulse" by Donald R. Rhodes, published in 1959 by McGraw-Hill Book Company, in which some of the terminology used herein is defined.

The correlator correlates these output ratios of the transmitter channels to form groups of four channels in each group, one channel for each transmitter, each group corresponding to one reflecting target. The correlator output consists of control information to the system computer telling it which of the plurality of counters associated with each transmitter are to be associated with which of the counters of the other transmitter channels.

In this particular system the antenna array consists of a single row of dipoles. The sensitivity beams of the apertures are fanshaped with a finite thickness and overlapping along the axis of the dipoles. The configuration of the beams may be altered by appropriate rearrangement of the dipole matrix. The single row matrix is practical and is simple for the purpose of explanation. The system may also be extended to use with additional apertures looking in different directions. The correlation of echoes and targets is improved with the addition of such apertures. If the array of dipoles is made in two dimensions pencil type beams can be obtained. These pencil beams, wide or narrow, may be employed two at a time for one dimensional grouping, or three at a time covering two angles for improved correlation. Any pair or trio of such fixed beams covers the entire surveillance space as previously defined. Systems in which it is desired to extend the capability of the system by employing a multiplicity of beams to divide the surveillance space into segments, each segment monitored by separate apertures, are particularly adapted to use of the amplitude ratio type of correlation described in this section of the application. Such systems require multiple beams even without the grouping requirement and the use of a multiple output phased array for this purpose is very appropriate. Each output of the phased array corresponds to an aperture pointing in a different direction. These separate apertures have little mutual coupling and are achieved by the manner of the phasing of the circuit matrix coupling together the outputs of the multiplicity of dipoles. The art of design and construction of such antennas is well understood.

Referring to FIG. 2, the antenna array consists of a row of separate dipoles 50. Each dipole is connected to its own radio frequency amplifier 51 which in turn feeds a mixer 52. The mixers 52 are also fed with a common injection signal. The output of the mixer 52 corresponding to each dipole is fed to a separate first I.F. amplifier 53. The outputs of the I.F. amplifiers 53 are coupled by active coupling circuits 54 to transmission line 55 which terminates in the output terminal 56. Terminal 56 then is the output terminal of one of the apertures of the antenna array. Similarly another aperture pointing in a different direction is obtained by couplers 57, transmission line 58, and output terminal 59. The couplers 54 and the couplers 57 are so adjusted that the sensitivity beams of their respective apertures are overlapping but are not pointing in exactly the same direction. There is substantial difference in the pointing directions of the two apertures.

The outputs of the two apertures are fed to the second I.F.. systems 60 and 61. The second mixer and the second I.F. are included in these blocks and the mixers share a common injection signal source. The circuits of the two apertures and the second I.F. systems 60 and 61 are made as nearly identical as practical so as to maintain similar gains and phase delays. Techniques common in the art are adequate for this purpose. The second I.F. signals from systems 60 and 61 are fed to the "sum and difference" circuit formed by summers 62 and 63 and the inverter 64. The output to terminal 8 forms the "sum" signal, designated the "A" signal. The output at terminal 9 is the "difference" signal, designated the "B" signal.

The "A" signal and the "B" signal are applied to the tracking channels as shown in FIG. 1. The outputs of the tracking channels shown at terminals 39, 40, 41 and 42 in FIG. 1 are applied to the correlator 65.

The "A" over "B" signal ratios of each channel are indicated on the indicators of the corresponding channel. The operator employs these indications to place each tracking channel corresponding to a given transmitter on a separate echo. The correlator then indicates from this information the grouping of the various counter readings.

Variations

It will be obvious to one skilled in the art that there are many possible variations of my invention. Typical of such variations are such systems in which there is a plurality of receiving stations and a single transmitting station. In this instance the transmitting station rather than the receiving station is equipped with the plurality of apertures. It is only necessary to modulate or otherwise provide a means of identification of the signal from each aperture so that it is recognizable at each receiving station as coming from that particular aperture. By combining this technique with that described in more detail elsewhere in this application, systems in which there are pluralities of both transmitting stations and receiving stations are derived.

Another modification of my invention is a system in which pulses are emitted from the transmitters rather than the continuous waves shown in the preferred embodiments described in more detail in this application. The system may employ either Doppler measurements or time delay of travel of the pulse for position determination, or it may employ both of these types of observation.

Other means than the tracking filters may be employed for the separation of the signals. Another modification of my invention employs time gates and pulses for obtaining this isolation.

While I have shown the preferred embodiments of my invention it will be understood that the invention is capable of variation and modification from the forms shown so that its scope should be limited only by the scope of the claims appended hereto.

What I claim is:

1. In a multistatic system for the simultaneous determination of the positions of a plurality of reflecting targets located in a given surveillance space, a method of associating the various echoes to form proper groups of echoes, each group containing echo signals resultant only from a single target comprising the following steps:
   (1) identifying the echoes of each transmitter at each receiver;
   (2) separating the various echo signals by directional multiple aperture means;
   (3) grouping together those signals evidencing the same directional characteristics.

2. A method of simultaneously detecting and determining the positions of a plurality of reflecting targets comprising the following steps:
   (1) illuminating the surveillance space with a plurality of separately spaced transmitting stations,
   (2) detecting the reflected signal energy at a receiving station employing a plurality of sensitivity apertures to group together those echoes coming from the same direction,
   (3) measuring characteristics of the signal echoes detected at the receiving station which characteristics are dependent upon the positions of the reflecting targets at significant epochs.

3. A method of grouping echo signals from a plurality of targets in a multiple transmitter, single receiver, reflective detection and position determining system comprising the following:
   (1) transmitting signals from each of a plurality of transmitters to the targets;
   (2) reflecting the transmitted signals from the targets;
   (3) detecting the reflected signals at a receiving station having a plurality of wave apertures whose electrical outputs are dependent upon the direction of the signal incident upon the station;
   (4) combining the reflected signals of said apertures to obtain an identifying signal for each target that is dependent upon the direction of the radiation incident upon the apertures; and
   (5) comparing the resultant identifying signals obtained in step (4) for all reflected signals, the signals reflected from the same target being identified by the same value of the identifying signal.

4. In a reflective method of target detection and position determination wherein signals of different frequency from a plurality of transmitters located at separate sites illuminate a plurality of targets, and the signals reflected from the targets are detected at a receiving station located at a site separate from the transmitting sites and having a plurality of separate apertures whose beams cover substantially the same surveillance spaced as the transmitter but whose space centers are significantly displaced; the improvement comprising the steps of:
   (1) detecting for each reflected signal, the phase differences between the outputs of pairs of said apertures, and
   (2) correlating the phase differences obtained in step (1) for each target for each transmitter with the phase differences obtained for the other transmitters, the echo signals reflected from one target being identified by each echo signal of the group of echo signals from the several transmitters having substantially the same phase difference as each of the other signals of the group echoed by one target.

5. In a reflective detection and position determination system wherein a surveillance space is illuminated with signals from a plurality of spaced transmitter sites, which signals from the separate sites have individually identifiable characteristics, and the echo signals reflected from a plurality of targets are detected at a receiving station located at a site separate from the transmitting sites and having a plurality of separate apertures with coincident phase centers but with their sensitivity beams overlapping and pointing in separate directions, an improved method of identifying the echo signals from targets illuminated by signals from several transmitters as coming from a common reflecting target comprising the steps of:
   (1) deriving from the received echo signals, signals sensitive to the direction of incidence of the echo signals upon the station by detecting for each echo signal from each target the ratio of the amplitudes of the signals from pairs of the separate apertures; and
   (2) comparing the signal ratios derived in step (1) for each target for each transmitter with the signal ratios derived from the received echo signals from the other transmitters, the group of signals from the several transmitters having substantially the same signal ratios identifying the echo signals of the several transmitters as coming from a common reflecting target.

6. In a reflective detection and position determination system wherein a surveillance space is illuminated with signals from a plurality of spaced transmitter sites, which signals from the separate sites have individually identifiable characteristics, and the echo signals reflected from a plurality of targets within the surveillance space are detected at a receiving station located at a site separate from the transmitting site and having a plurality of separate apertures with coincident phase centers but with their sensitivity beams overlapping and pointing in separate directions; an improved method of selecting at the receiving station, from among the multiplicity of echo signals thereat, a set of echo signals comprising only one signal corresponding to each transmitter and all of which last mentioned echo signals are echoed by a single target comprising the following steps:
   (1) deriving from the received echo signals, signals sensitive to the direction of incidence of each echo signal upon the station by detecting for each echo signal from each target the ratio of the amplitudes of the signals from a pair of separate apertures;
   (2) comparing the ratios determined in step (1); and
   (3) selecting a set of echo signals comprising one echo signal for each transmitter, each echo signal of said set having the same ratio as the other signals comprising said set.

7. The method as defined in claim 6 wherein the certainty of the selection of the echoes from a single target is improved by:
   (4) performing step (1) simultaneously for a plurality of aperture pairs at the receiving station;
   (5) comparing the ratios determined in step (1) for each aperture pair; and
   (6) selecting a set of echo signals each of which echo signals has the same ratio using each aperture pair separately.

8. The method of identifying echo signals comprising:
   (1) transmitting individually identifiable signals from a plurality of spaced transmitting stations to illuminate all targets within a common surveillance space;
   (2) reflecting the signals from the targets to produce echo signals;
   (3) receiving the echo signals at a receiving station sensitive to echo signals from all the targets in said surveillance space;
   (4) determining the direction of incidence of each of the echo signals upon the receiving station; and
   (5) comparing the incident direction of the various echo signals produced by each transmitting station with the incident direction of the echo signals produced by the other transmitting stations, the echo signals of the several transmitters coming from a common reflecting target being identified as those with a common direction of incidence upon the receiving station.

9. A method of identifying echo signals comprising:
   (1) transmitting individually identifiable signals from a plurality of spaced transmitting stations to illuminate all targets within a common surveillance area;
   (2) reflecting the signals from the targets to produce echo signals;
   (3) receiving the echo signals at a receiving station sensitive to echo signals from targets in the said surveillance space;
   (4) separating the echo signals of each transmittter by sensing the doppler phenomenon resultant from the motion of the targets relative to the transmitting and receiving stations;
   (5) determining the direction of incidence of each of the separated echo signals upon the receiving station; and
   (6) comparing the incident direction of the echo signals of each transmitter with the incident directions of the echo signals of the other transmitters, the echo signals coming from a common target being identified as those with a common direction of incidence upon the receiving station.

10. In a reflective method of target detection and position determination wherein waves are emitted from a plurality of spaced transmitters the wave from each transmitter having characteristics which are different in some identifiable respect from the waves emitted by each of the other transmittters, and wherein the echo signals from each of a plurality of moving targets are detected simultaneously at a receiving station, the improvement comprising:
   (1) separating into separate channels the echo signals of each of the transmitters by employing the identifying wave characteristics peculiar to each transmitter;
   (2) separating the signals of each channel by doppler tracking filters;
   (3) determining from the separate signals from each channel the direction of incidence of the reflected waves upon the receiving station; and
   (4) comparing the incident directions of the various echoes of each transmitter with the incident directions of the echoes of the other transmitters to form groups comprising a single echo signal from each transmitter, each group of such echo signals corresponding to a single target.

11. In a multistatic system for the detection and location of a plurality of reflecting targets located in the same surveillance space wherein the surveillance space is illuminated by signals from a single transmitting station having a plurality of apertures separately oriented in space, the signal from each aperture having characteristics separately identifiable from the signals of each of the other apertures, and wherein the echo signals reflected from a plurality of targets are detected at a plurality of receiving stations each of which has means for identifying the signals emitted from the separate transmitting apertures, a method of associating the various echoes received at the several receiving stations into groups each of which group includes only the received signals of a single reflecting target comprising the following steps:
   (1) separating at each receiving station the echoed signals of each transmitting aperture into a separate channel by employing the identifying wave characteristics peculiar to each transmitting aperture;
   (2) combining at each receiving station the signals of the separate transmitter apertures reflected from each of the reflecting targets to form a signal, at the receiving station, that is dependent upon the bearing of the target from the transmitting station, and
   (3) comparing the signals formed in step (2) for each echo signal at the several receiving stations to form groups of signals comprising one signal from each receiving station and all of which signals forming the group are echoes from the same target.

12. In a static system of transmitting and receiving stations for the simultaneous detection of a plurality of moving reflecting targets and the determination of the positions thereof, a method of associating various reflected echoes into groups each of which groups includes the detected echoes corresponding to a single reflecting target comprising the following staps:
   (1) transmitting from each transmitting station waves whose characteristics identify the emitted wave as originating at that particular transmitting station;
   (2) simultaneously reflecting all of said waves from a plurality of moving targets;
   (3) detecting all of said reflected waves at each receiving station;
   (4) separating the reflected waves at each receiving station by the identifying wave characteristics to identify those signals originating from each transmitting station;
   (5) separating the various received reflected waves by observation of the Doppler phenomenon;
   (6) detecting the echo characteristic dependent upon the position of that reflecting target in space; and
   (7) selecting those echoes having the same position dependent characteristic to form groups of signals all of which are echoed from the same target.

13. In a Polystation Doppler system for the detection of a plurality of moving reflecting targets and the determination of the position thereof wherein signals from a plurality of transmitting stations illuminate the same surveillance space, the signal from each transmitting station having a characteristic that is recognizable and distinguishable as originating at a particular station, and wherein the echo signals reflected from the targets are detected at a receiving station sensitive to the echo signals reflected from targets located in the surveillance space, a method of determining which of the detected echo signals are reflected from the same target comprising:
   (1) separating at the receiving station the echo signals according to the distinguishing characteristic of the signal provided at the transmitting stations;
   (2) tracking each received echo signal by a phase locked tracking filter to isolate each received echo signal and to provide a signal adapted to be measured for position determination by the Polystation Doppler method;

(3) generating at the receiving stations a signal for each received echo signal which generated signal is dependent upon the direction of incidence of said echo signal with which it is associated; and (4) selecting those generated signals evidencing the same direction of incidence upon the receiving station.

14. A method of simultaneously detecting the position of a plurality of moving reflecting targets in space comprising the following steps:

(1) illuminating a surveillance space by a plurality of separately spaced electromagnetic radiators employing unmodulated continuous wave signals;

(2) detecting at a receiving station the electromagnetic signals radiated by the radiators and reflected by the moving reflecting targets, which receiving station has a plurality of receiving apertures whose phase centers are displaced from each other but all of which point in the same direction and whose beams are of the same sensitivity contour and include the same surveillance space;

(3) comparing the phase differences of the signals from the plurality of apertures for each reflected signal with the similar phase differences of other reflected signals originating from other radiators to obtain groups of reflected signals, each group comprising only reflected signals from a single target and one such signal originating from each of the transmitters;

(4) tracking the phase of each of the reflected signals with a tracking filter, and (5) measuring the net phase change of each reflected signal occurring between significant epochs, said significant epochs being common for the measurements of the reflected signals for each group.

15. A method of simultaneously detecting and determining the positions of each of a plurality of reflecting targets in space comprising the following steps:

(1) illuminating with a radio transmitter a surveillance space by radiation from a plurality of radiating apertures each separately oriented in space and whose radiated signals are provided with an identifying characteristic;

(2) receiving the reflected signal energy at a plurality of receiving stations each having aperture beams sufficiently broad to include the entire surveillance space;

(3) separating at each receiving station the signals originating at each of the radiating apertures;

(4) detecting for each received reflected signal a characteristic that is dependent upon the bearing of the target reflecting that signal from the radio transmitter; and (5) comparing the characteristics detected in step (4) to group together those signals reflected by a target lying in the same bearing from the radio transmitter thereby identifying the said reflected signals as coming from the same target.

16. In a system of detecting simultaneously the presence and positions of a plurality of moving reflecting target objects, a method of grouping echo signals comprising:

(1) illuminating a surveillance space by a plurality of separately spaced radio transmitters emitting unmodulated continuous waves in beams sufficiently broad to include the entire surveillance space, the frequency of each transmitter being sufficiently removed from the frequency of the other transmitters that there is not overlapping of the Doppler spectrums of the several transmitters resultant from the motions of the targets to provide an identifying characteristic to the echo signals as originating at each of the several transmitters;

(2) detecting at a receiving station the radio signals radiated by the transmitters and reflected to the receiving station by the moving target objects;

(3) separating the Doppler spectrums of each transmitter from the Doppler spectrums of the other transmitters to identify at the receiving station the reflected signals corresponding to each transmitter;

(4) tracking each Doppler signal with a tracking filter, and (5) selecting those echo signals incident upon the receiving station in the same direction.

No references cited.

CHESTER L. JUSTUS, *Primary Examiner.*

T. H. TUBBESING, *Assistant Examiner.*